United States Patent
Lai et al.

(10) Patent No.: US 7,742,296 B2
(45) Date of Patent: Jun. 22, 2010

(54) COMPUTER HAVING APPARATUSES FOR COOLING ELEMENTS

(75) Inventors: Hsiu-Chang Lai, Taipei Hsien (TW); Zhen-Xing Ye, Shenzhen (CN); Ke Sun, Shenzhen (CN); Ming-Ke Chen, Shenzhen (CN); Xiao-Zhu Chen, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 170 days.

(21) Appl. No.: 11/957,418

(22) Filed: Dec. 15, 2007

(65) Prior Publication Data

US 2009/0059516 A1 Mar. 5, 2009

(30) Foreign Application Priority Data

Aug. 30, 2007 (CN) .................. 2007 1 0201537

(51) Int. Cl.
*H05K 5/00* (2006.01)
*H05K 7/20* (2006.01)
*F28F 7/00* (2006.01)
*H01L 23/26* (2006.01)

(52) U.S. Cl. .............. 361/679.5; 361/695; 361/679.47; 361/679.49; 361/697; 165/80.3; 454/184; 174/16.3

(58) Field of Classification Search .............. 361/687; 454/184
See application file for complete search history.

(56) References Cited

U.S. PATENT DOCUMENTS

| | | | | |
|---|---|---|---|---|
| 4,702,154 A * | 10/1987 | Dodson | ................ | 454/184 |
| 5,297,005 A * | 3/1994 | Gourdine | ................ | 361/697 |
| 5,422,787 A * | 6/1995 | Gourdine | ................ | 361/697 |
| 5,424,915 A * | 6/1995 | Katooka et al. | ................ | 361/695 |
| 5,440,450 A * | 8/1995 | Lau et al. | ................ | 361/695 |
| 5,493,457 A * | 2/1996 | Kawamura et al. | ................ | 720/648 |
| 5,510,954 A * | 4/1996 | Wyler | ................ | 361/679.54 |
| 5,559,673 A * | 9/1996 | Gagnon et al. | ................ | 361/695 |
| 5,596,483 A * | 1/1997 | Wyler | ................ | 361/679.47 |
| 5,673,029 A * | 9/1997 | Behl et al. | ................ | 340/635 |
| 5,680,295 A * | 10/1997 | Le et al. | ................ | 361/695 |
| 5,751,550 A * | 5/1998 | Korinsky | ................ | 361/695 |
| 5,793,608 A * | 8/1998 | Winick et al. | ................ | 361/695 |
| 5,886,639 A * | 3/1999 | Behl et al. | ................ | 340/635 |
| 6,002,586 A * | 12/1999 | Chen et al. | ................ | 361/695 |
| 6,021,042 A * | 2/2000 | Anderson et al. | ................ | 361/695 |

(Continued)

*Primary Examiner*—Jayprakash N Gandhi
*Assistant Examiner*—Bradley H Thomas
(74) *Attorney, Agent, or Firm*—Frank R. Niranjan

(57) ABSTRACT

A computer includes a chassis, a motherboard, an air guiding member, and a fan. The chassis includes a rear wall at a rear side thereof and a sidewall at a lateral side thereof. The rear wall defines a plurality of inlet holes therein, and the sidewall defines a plurality of outlet holes therein. The motherboard is received in the chassis opposite to the sidewall, a heat sink is installed on the motherboard for dissipating heat generated by a processor mounted on the motherboard. The air guiding member is received in the chassis at a front side, for guiding air drawn into the chassis through the inlet holes toward the outlet holes. The fan is used for drawing air from outside of the chassis through the inlet holes, and blowing the air out of the chassis through the outlet holes.

8 Claims, 4 Drawing Sheets

U.S. PATENT DOCUMENTS

| | | | | |
|---|---|---|---|---|
| 6,027,535 A * | 2/2000 | Eberle et al. | | 361/690 |
| 6,086,476 A * | 7/2000 | Paquin et al. | | 454/184 |
| 6,185,097 B1 * | 2/2001 | Behl | | 361/695 |
| 6,239,970 B1 * | 5/2001 | Nakai et al. | | 361/695 |
| 6,256,197 B1 * | 7/2001 | Galis | | 361/679.46 |
| 6,272,007 B1 * | 8/2001 | Kitlas et al. | | 361/679.32 |
| 6,343,011 B1 * | 1/2002 | Yu | | 361/695 |
| 6,370,023 B1 * | 4/2002 | Su | | 361/679.48 |
| 6,400,568 B1 * | 6/2002 | Kim et al. | | 361/697 |
| 6,442,024 B1 * | 8/2002 | Shih | | 361/695 |
| 6,452,797 B1 * | 9/2002 | Konstad | | 361/695 |
| 6,504,718 B2 * | 1/2003 | Wu | | 361/695 |
| 6,587,335 B1 * | 7/2003 | Nelson et al. | | 361/679.49 |
| 6,618,248 B1 * | 9/2003 | Dalheimer | | 361/679.33 |
| 6,657,858 B2 * | 12/2003 | Rothschild | | 361/679.33 |
| 6,678,157 B1 * | 1/2004 | Bestwick | | 361/695 |
| 6,775,134 B2 * | 8/2004 | Chen | | 361/679.47 |
| 6,785,145 B1 * | 8/2004 | Wong | | 361/752 |
| 6,805,626 B2 * | 10/2004 | Chen | | 454/184 |
| 6,822,863 B1 * | 11/2004 | Artman et al. | | 361/695 |
| 6,871,879 B2 * | 3/2005 | Gan | | 285/189 |
| 6,940,716 B1 * | 9/2005 | Korinsky et al. | | 361/695 |
| 6,970,353 B2 * | 11/2005 | Brovald et al. | | 361/679.5 |
| 6,972,951 B2 * | 12/2005 | Schmid | | 361/679.48 |
| 6,999,312 B1 * | 2/2006 | Garnett et al. | | 361/679.54 |
| 7,027,299 B2 * | 4/2006 | Wrycraft et al. | | 361/695 |
| 7,035,102 B2 * | 4/2006 | Holmes et al. | | 361/695 |
| 7,061,761 B2 * | 6/2006 | Tucker et al. | | 361/695 |
| 7,120,017 B2 * | 10/2006 | Shieh | | 361/695 |
| 7,126,819 B2 * | 10/2006 | Liang | | 361/695 |
| 7,193,846 B1 * | 3/2007 | Davis et al. | | 361/679.5 |
| 7,203,063 B2 * | 4/2007 | Bash et al. | | 361/699 |
| 7,248,472 B2 * | 7/2007 | Vinson et al. | | 361/694 |
| 7,254,021 B2 * | 8/2007 | Lee et al. | | 361/695 |
| 7,256,993 B2 * | 8/2007 | Cravens et al. | | 361/690 |
| 7,259,961 B2 * | 8/2007 | Lucero et al. | | 361/695 |
| 7,286,357 B2 * | 10/2007 | Wung et al. | | 361/700 |
| 7,310,228 B2 * | 12/2007 | Chen | | 361/695 |
| 7,324,338 B1 * | 1/2008 | Chi et al. | | 361/695 |
| 7,342,786 B2 * | 3/2008 | Malone et al. | | 361/695 |
| 7,382,613 B2 * | 6/2008 | Vinson et al. | | 361/679.48 |
| 7,403,388 B2 * | 7/2008 | Chang | | 361/695 |
| 7,428,149 B2 * | 9/2008 | Cheng et al. | | 361/690 |
| 7,480,140 B2 * | 1/2009 | Hara et al. | | 361/692 |
| 7,561,428 B2 * | 7/2009 | Watanabe | | 361/714 |
| 7,573,712 B2 * | 8/2009 | Wu et al. | | 361/695 |
| 7,586,746 B2 * | 9/2009 | Liu | | 361/695 |
| 7,611,402 B2 * | 11/2009 | McClellan et al. | | 454/184 |
| 2002/0067595 A1 * | 6/2002 | Ogawa | | 361/687 |
| 2004/0004812 A1 * | 1/2004 | Curlee et al. | | 361/687 |
| 2004/0095723 A1 * | 5/2004 | Tsai et al. | | 361/695 |
| 2005/0041392 A1 * | 2/2005 | Chen | | 361/695 |
| 2005/0117294 A1 * | 6/2005 | Hsieh | | 361/695 |
| 2005/0174732 A1 * | 8/2005 | Lin | | 361/695 |
| 2005/0180102 A1 * | 8/2005 | Kim | | 361/694 |
| 2005/0259393 A1 * | 11/2005 | Vinson et al. | | 361/690 |
| 2006/0181846 A1 * | 8/2006 | Farnsworth et al. | | 361/695 |
| 2007/0275650 A1 * | 11/2007 | Chen | | 454/184 |
| 2008/0024985 A1 * | 1/2008 | Lee et al. | | 361/695 |
| 2008/0151492 A1 * | 6/2008 | Maddox | | 361/687 |
| 2008/0180905 A1 * | 7/2008 | Peng et al. | | 361/687 |

* cited by examiner

COMPUTER HAVING APPARATUSES FOR COOLING ELEMENTS

BACKGROUND

1. Field of the Invention

The present invention generally relates to computers. Particularly, the present invention relates to a computer having apparatuses for cooling elements therein.

2. Description of Related Art

Computers, such as desktop computers, notebook computers, and servers, have fans and heat sinks for dissipating heat generated by electronic elements therein. Popularly, the electronic elements of a computer are installed in a chassis in which holes are defined to allow air to flow into the chassis, thus dissipating the heat and cooling the electronic elements.

In a common computer, storage devices, such as hard disks are installed to a front side of the chassis of the computer, while extension cards and processors are installed to a rear side of the computer. Holes are usually defined in a front wall of the chassis, causing the air to flow a long distance to the processors through the hard disks. Therefore, the air flowing to the processors has already been heated by the hard disks, which lowers the cooling efficiency of the airflow. Moreover, the air flowing into the chassis from the holes are mixed with air flowing into the chassis around the extension cards, thus eddies are easily formed, which lessens the cooling efficiency of the airflow in the chassis.

SUMMARY

In one embodiment, a computer includes a chassis, a motherboard, an air guiding member, and a fan. The chassis includes a rear wall at a rear side thereof and a sidewall at a lateral side thereof. The rear wall defines a plurality of inlet holes therein, and the sidewall defines a plurality of outlet holes therein. The motherboard is received in the chassis opposite to the sidewall, and a heat sink is installed on the motherboard for dissipating heat generated by a processor mounted on the motherboard. The air guiding member is received in the chassis at a front side, for guiding air drawn into the chassis through the inlet holes toward the outlet holes. The fan is used for drawing air from outside of the chassis through the inlet holes, and blowing the air out of the chassis through the outlet holes.

Other advantages and novel features of the computer will become more apparent from the following detailed description of preferred embodiments when taken in conjunction with the accompanying drawings, in which:

DETAILED DESCRIPTION

Figure 1:
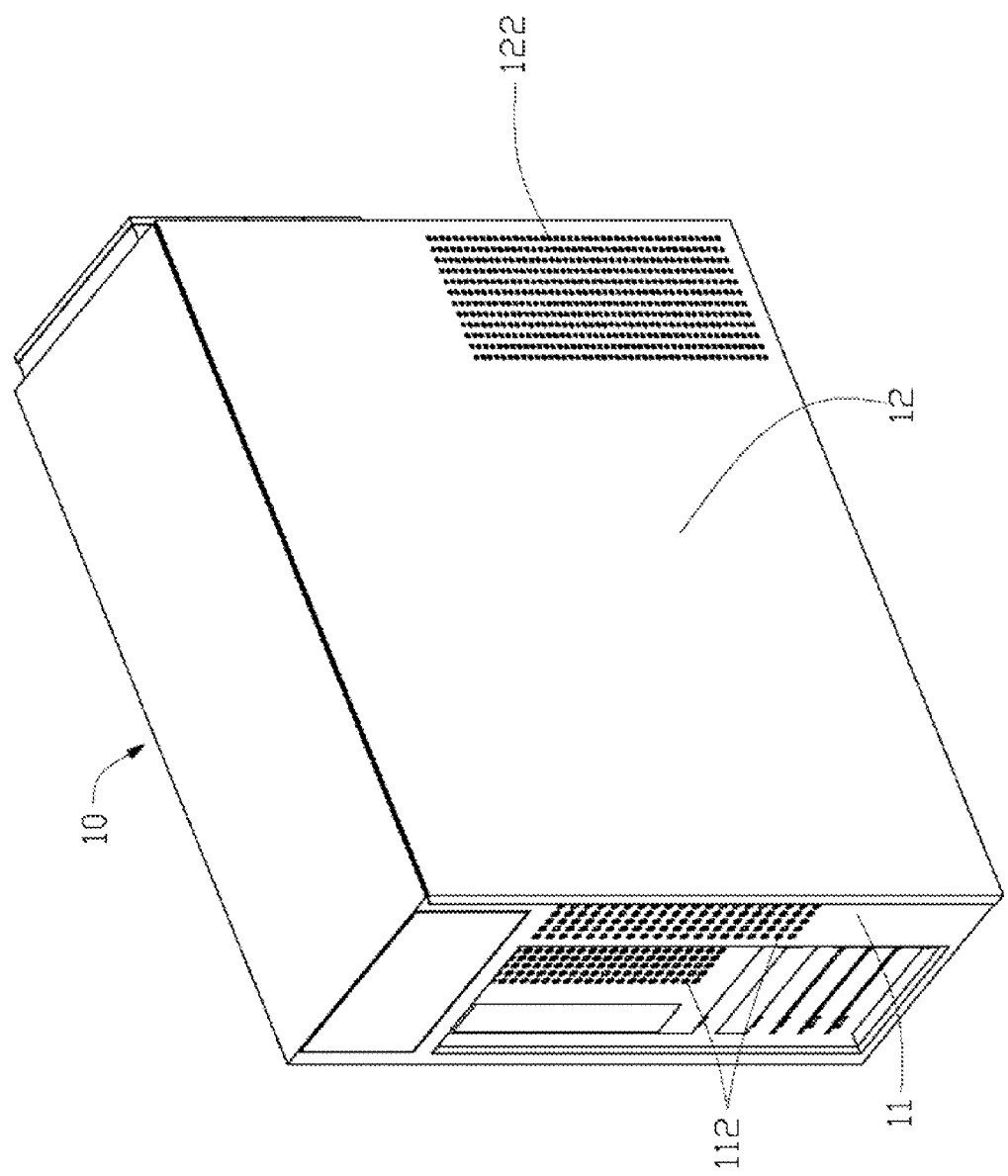
FIG. 1 is an isometric view of a computer in accordance with a first exemplary embodiment of the present invention, the computer includes a sidewall.

Referring to FIG. 1, a computer includes a chassis 10. The chassis 10 is formed by a plurality of sidewalls including a rear wall 11 at a rear side thereof and a sidewall 12 adjacent and perpendicular to the rear wall 11. A plurality of inlet holes 112 is defined in the rear wall 11, and a plurality of outlet holes 122 is defined in the sidewall 12.

Figure 2:
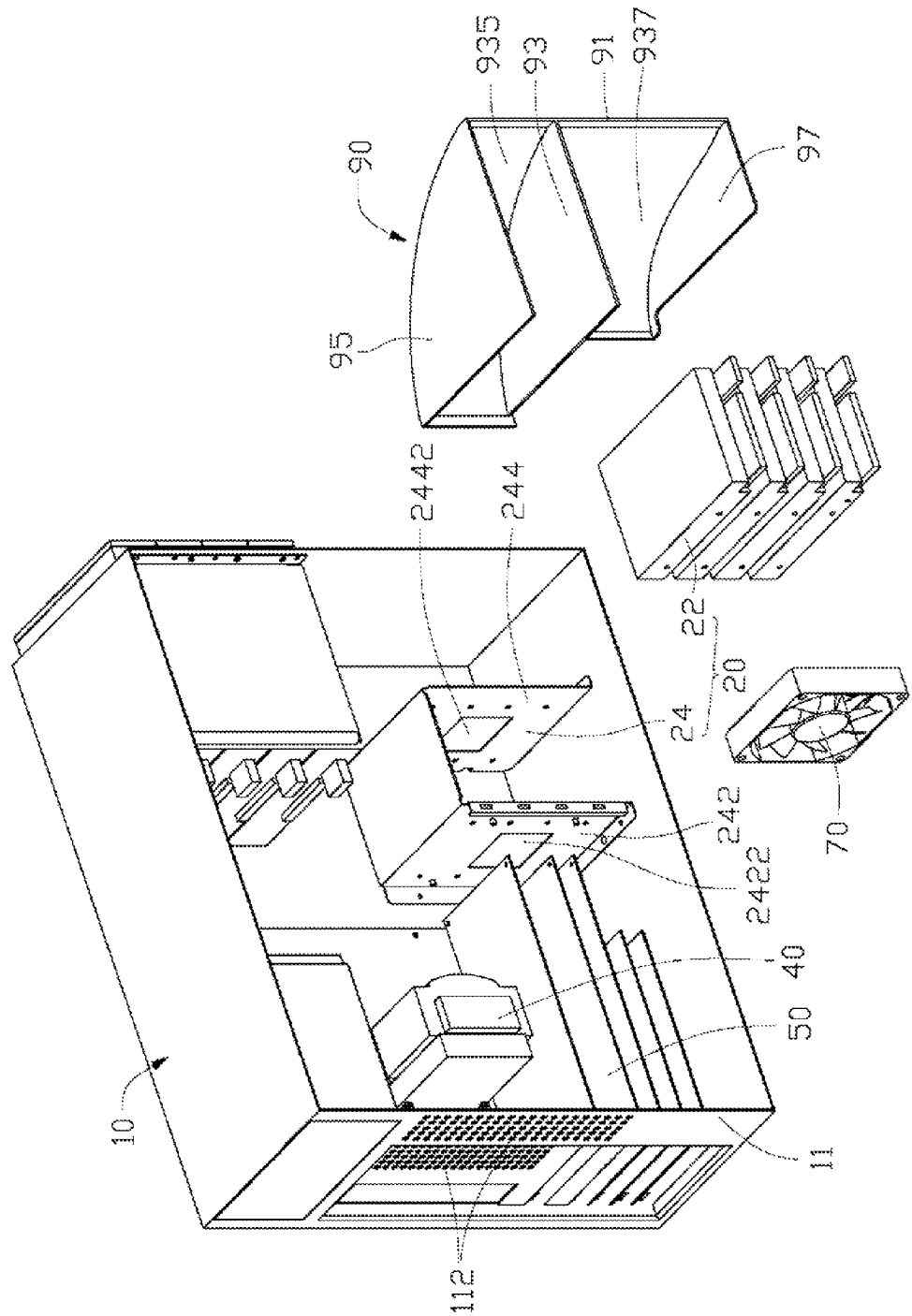
FIG. 2 is an exploded view of FIG. 1, without the sidewall.

Referring to FIG. 2, the computer further includes a storage module 20, a heat sink 40, a plurality of extension cards 50, a fan 70, and an air guiding member 90.

The storage module 20 includes a plurality of disk drives 22 and a frame 24 for accommodating the disk drives 22 therein. The frame 24 is installed in the chassis 10. The frame 24 includes two walls 242, 244 that are parallel to each other. The walls 242, 244 define two openings 2422, 2442 aligning with each other, for allowing air to flow through the disk drives 22 accommodated in the frame 24.

The air guiding member 90 includes an arc-shaped side plate 91 and a plurality of parallel flat plates 93, 95, and 97 that are generally sector-shaped with the radii thereof forming an angle therebetween of less than 180 degrees. Arc edges of the flat plates 93, 95, and 97 are connected to an inner surface of the side plate 91, respectively in a middle, top, and bottom position. A straight edge of each of the flat plates 93, 95, and 97 faces the inlet holes 112, and the other straight edge of each of the flat plates 93, 95, and 97 faces the outlet holes 122, for guiding the air flowing from the inlet holes 112 toward the outlet holes 122. The flat plates 93, 95 and the side plate 91 cooperate to form a first air passage 935, and the flat plates 93, 97 and the side plate 91 cooperate to form a second air passage 937.

Figure 3:
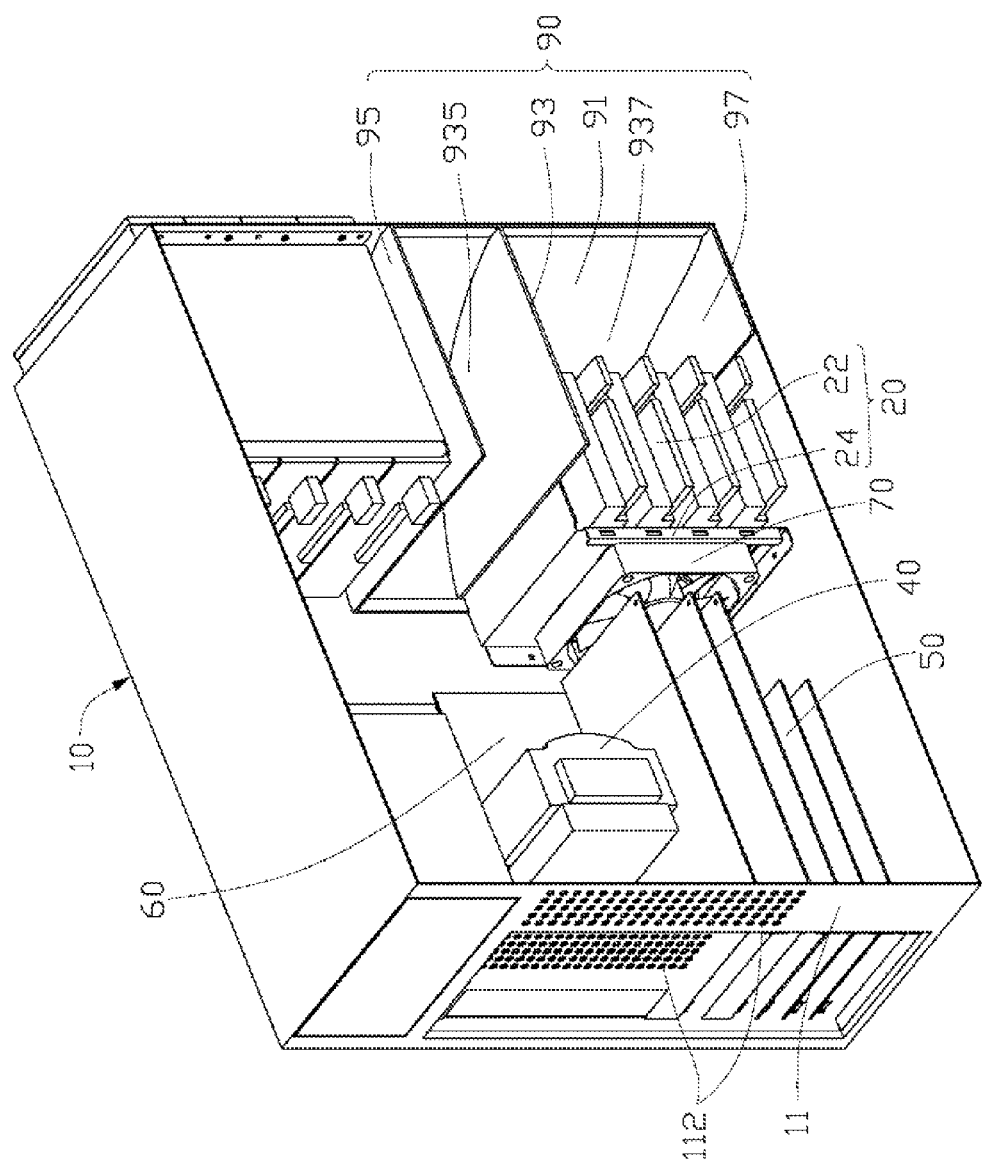
FIG. 3 is an assembled view of FIG. 2.

Referring also to FIG. 3, in assembly, the heat sink 40 and the extension cards 50 are installed to a rear side of a motherboard 60 which is fixed to a sidewall opposite to the sidewall 12 of the chassis 10. The extension cards 50 are adjacent and generally perpendicular to the rear wall 11, for allowing air to flow between every two extension cards 50 in a direction parallel to the extension cards 50. The air guiding member 90 is mounted to a front side of the chassis 10, with an open side thereof facing the sidewall 12. The fan 70 is installed to the wall 242 of the frame 24, aligning with the opening 2422. The disk drives 22 are stacked to be fixed in the frame 24 between and perpendicular to the walls 242 and 244. The storage module 20, including the disks 22 and the frame 24, is generally received in the second air passage 937.

Figure 4:
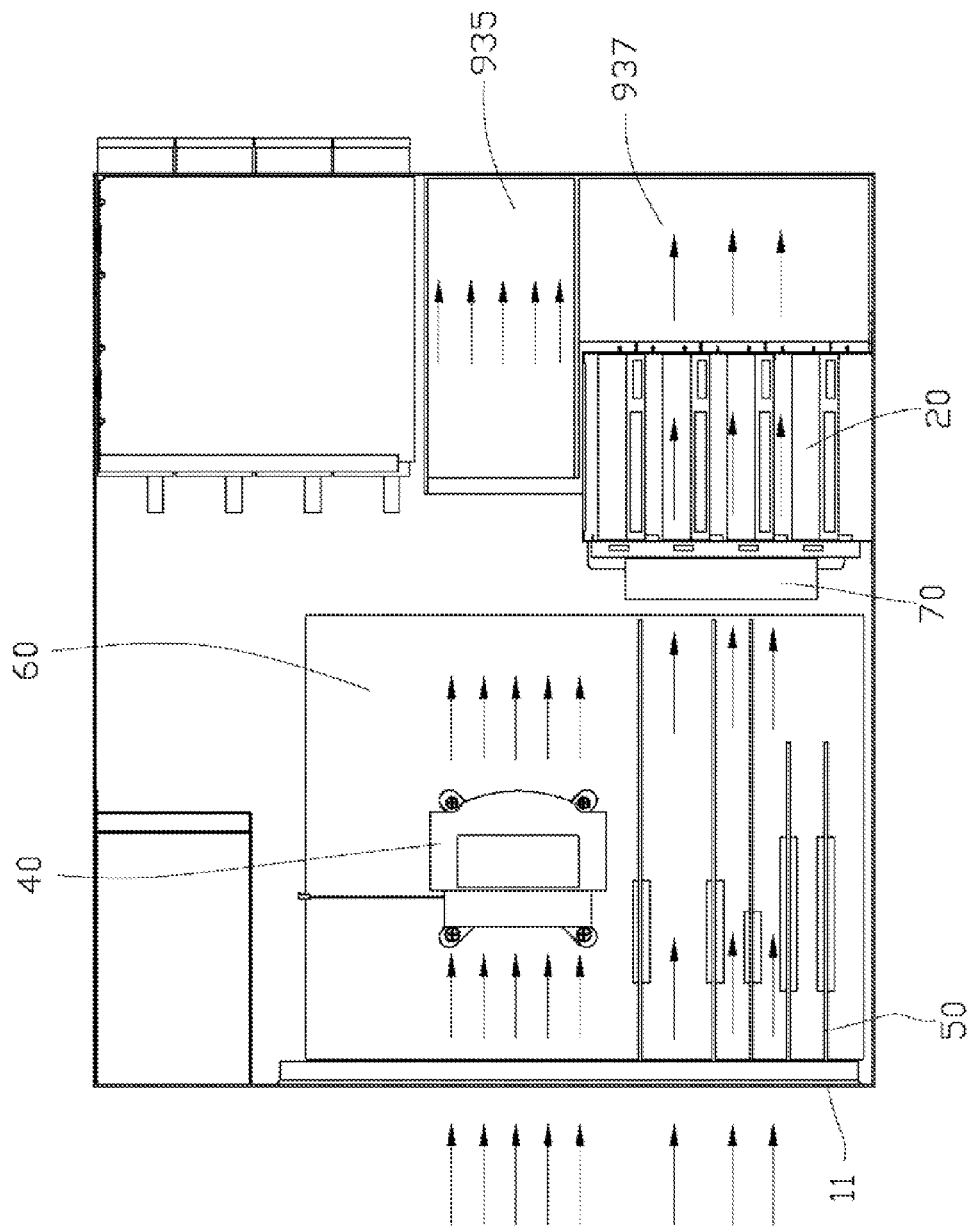
FIG. 4 is a schematic view of air flow in the computer of FIG. 1.

Referring to FIG. 4, in use, the fan 70 is operated, and air is drawn into the chassis 10 through the inlet holes 112 on the first sidewall 11. A part of the drawn air flows through the heat sink 40 and processors (not shown) under the heat sink 40 to be guided out of the chassis 10 through the first air passage 935, and the outlet holes 122 by the arc side panel 91 of the air guiding member 90. The other part of the drawn air flows through the extension cards 50, and directed by the fan 70 to flow into the storage module 20 through the opening 2422 defined in the wall 242. The air then flows out from the storage module 20 through the opening 2442 and is guided out of the chassis 10 through the second air passage 937, and the outlet holes 122 by the arc side panel 91 of the air guiding member 90.

In the computer, air is drawn into the chassis 10 through the inlet holes 112 at a rear side of the chassis 10 to a lateral side of the chassis 10 and out of the chassis 10 through the outlet holes 122 at the lateral side. A part of the air is guided out of the chassis 10 through the first air passage 935 after cooling the processor on the motherboard. The other part of the air flows through the extension cards 50 first, and is then pumped into the storage module 20 for cooling the disk drives 22 that are received in the second air passage 937, before being guided out of the chassis 10 through the second air passage 937. The air flowing through the extension cards 50 is well guided, thus eddies forming around the extension cards 50 are avoided. Therefore, cooling efficiency of airflow in the computer is improved.

The embodiment was chosen and described in order to explain the principles of the invention and its practical application so as to enable others skilled in the art to utilize the invention and various embodiments and with various modifications as are suited to the particular use contemplated. Alternative embodiments will become apparent to those skilled in the art to which the present invention pertains without departing from its spirit and scope. Accordingly, the scope of the present invention is defined by the appended claims rather than the foregoing description and the exemplary embodiment described therein.

What is claimed is:

1. A computer comprising:
   a chassis comprising a rear wall at a rear side thereof and a sidewall at a lateral side thereof, the rear wall defining a plurality of inlet holes therein, and the sidewall defining a plurality of outlet holes therein;
   a motherboard being received in the chassis opposite to the sidewall, a heat sink is installed on the motherboard for dissipating heat generated by a processor mounted on the motherboard;
   an air guiding member being received in the chassis at a front side, for guiding air drawn into the chassis through the inlet holes toward the outlet holes;
   a fan for drawing the air from outside of the chassis through the inlet holes, and blowing the air out of the chassis through the outlet holes; and
   at least one extension card installed on the motherboard close to the rear wall of the chassis, and a storage module adjacent to the front side of the chassis away from the rear wall of the chassis and substantially aligned with the at least one extension card;
   wherein the air guiding member comprises an arc-shaped side plate, a first flat plate, and a second flat plate parallel to the first flat plate that define a first air passage aligning with the heat sink, for guiding the air that flows from the heat sink after cooling the processor to flow out of the chassis through the outlet holes;
   the air guiding member further comprising a third flat plate parallel to the second flat plate and arranged at a side of the second flat plate opposite to the first flat plate, the third flat plate, the side plate, and the second plate define a second air passage substantially parallel to the first air passage and aligning with the at least one extension card and the storage module, for guiding the air that flows from the at least one extension card and the storage module after cooling the at least one extension card and the storage module to flow out of the chassis through the outlet holes.

2. The computer as described in claim 1, wherein the rear wall is perpendicular to the sidewall.

3. The computer as described in claim 1, wherein said at least one extension card is perpendicular to the rear wall.

4. The computer as described in claim 1, wherein the storage module comprises a frame and at least one disk drive received in the frame, the fan is fixed to an outer side of the frame.

5. The computer as described in claim 4, wherein the frame comprises two walls of the frame parallel to each other, the disk drive being fixed between the walls.

6. The computer as described in claim 5, wherein the walls of the frame are parallel to the rear wall.

7. The computer as described in claim 5, wherein two holes aligning with each other are defined in the walls of the frame respectively, to allow the air to flow into and out from the storage module, respectively.

8. The computer as described in claim 7, wherein the fan is fixed to one of the walls of the frame aligning with the hole defined in said one of the walls of the frame.

* * * * *